(12) United States Patent
Chu

(10) Patent No.: US 9,751,066 B2
(45) Date of Patent: Sep. 5, 2017

(54) REACTOR FOR PRODUCING HIGH-PURITY GRANULAR SILICON

(71) Applicant: Xi Chu, Mounds View, MN (US)

(72) Inventor: Xi Chu, Mounds View, MN (US)

(73) Assignee: Sunnyside Technologies, Inc, Mounds View, MN (US)

( * ) Notice: Subject to any disclaimer, the term of this patent is extended or adjusted under 35 U.S.C. 154(b) by 892 days.

(21) Appl. No.: 13/969,556

(22) Filed: Aug. 17, 2013

(65) Prior Publication Data

US 2013/0336845 A1    Dec. 19, 2013

Related U.S. Application Data

(63) Continuation of application No. 13/043,155, filed on Mar. 8, 2011, now Pat. No. 8,535,614.

(51) Int. Cl.
*B01J 8/12* (2006.01)
*C01B 33/027* (2006.01)
(Continued)

(52) U.S. Cl.
CPC ............. *B01J 8/008* (2013.01); *B01J 8/087* (2013.01); *B01J 8/12* (2013.01); *B01J 8/16* (2013.01);
(Continued)

(58) Field of Classification Search
None
See application file for complete search history.

(56) References Cited

U.S. PATENT DOCUMENTS 4,207,360 A * 6/1980 Padovani ................ C01B 33/02
117/901
4,786,477 A * 11/1988 Yoon .......................... B01J 8/42
118/716

(Continued)

FOREIGN PATENT DOCUMENTS

JP    55142538 A  * 11/1980 ................ B01J 8/40
JP    60005013 A  *  1/1985
(Continued)

OTHER PUBLICATIONS

Machine translation for JP 06-127927 A (May 1994).*
Machine translation for JP 02-279512 A (Nov. 1990).*
Machine translation for JP 06-080412 A (Mar. 1994).*

*Primary Examiner* — Jennifer A Leung

(57) ABSTRACT

The present invention provides a reactor and a method for the production of high purity silicon granules. The reactor includes a reactor chamber; and the reaction chamber is equipped with a solid feeding port, auxiliary gas inlet, raw material gas inlet, and exhaust gas export. The reaction chamber is also equipped with an internal gas distributor; a heating unit; an external exhaust gas processing unit connected between a preheating unit and a gas inlet. The reaction chamber is further equipped with a surface finishing unit, a heating unit and a dynamics generating unit. The reaction is through decomposition of silicon containing gas in densely stacked high purity granular silicon layer reaction bed in relative motion, and to use remaining heat of exhaust gas for reheating. The present invention is to achieve a large scale, efficient, energy saving, continuous, low cost production of high purity silicon granules.

5 Claims, 15 Drawing Sheets

(51) Int. Cl.
  *B01J 8/00* (2006.01)
  *B01J 8/08* (2006.01)
  *B01J 8/16* (2006.01)
  *B01J 15/00* (2006.01)
  *C01B 33/037* (2006.01)
  *C01B 33/025* (2006.01)
  *C01B 33/03* (2006.01)

(52) U.S. Cl.
  CPC ............. *B01J 15/00* (2013.01); *C01B 33/027* (2013.01); *C01B 33/037* (2013.01); *C01B 33/025* (2013.01); *C01B 33/03* (2013.01); *Y02P 20/129* (2015.11)

(56) References Cited

U.S. PATENT DOCUMENTS

| | | | |
|---|---|---|---|
| 5,298,296 A * | 3/1994 | Kojima | B01J 2/006 118/716 |
| 6,827,786 B2 * | 12/2004 | Lord | B01J 8/003 118/716 |
| 7,029,632 B1 | 4/2006 | Weldhaus et al. | |
| 7,553,466 B2 | 6/2009 | Herold et al. | |
| 7,790,129 B2 | 9/2010 | Lord | |
| 7,972,562 B2 | 7/2011 | Kim et al. | |
| 8,017,024 B2 | 9/2011 | Kim et al. | |
| 8,114,352 B2 | 2/2012 | Kim et al. | |
| 8,158,093 B2 | 4/2012 | Sanchez et al. | |
| 8,168,123 B2 | 5/2012 | Sanchez et al. | |
| 8,449,848 B2 | 5/2013 | Bhusarapu et al. | |
| 8,452,547 B2 | 5/2013 | Bhusavapu et al. | |
| 2008/0299291 A1 * | 12/2008 | Weidhaus | C01B 33/027 427/8 |
| 2011/0117729 A1 | 5/2011 | Osborne et al. | |
| 2012/0164323 A1 | 6/2012 | Bhusarapu et al. | |
| 2013/0084233 A1 | 4/2013 | Bhusarapu et al. | |
| 2013/0084234 A1 | 4/2013 | Bhusarapu et al. | |

FOREIGN PATENT DOCUMENTS

| | | | | |
|---|---|---|---|---|
| JP | 02279512 A | * | 11/1990 | |
| JP | 06080412 A | * | 3/1994 | |
| JP | 06127923 A | * | 5/1994 | ........... C01B 33/035 |
| JP | 06127927 A | * | 5/1994 | |
| KR | WO 2008018760 A1 | * | 2/2008 | ........... C01B 33/027 |

* cited by examiner

REACTOR FOR PRODUCING HIGH-PURITY GRANULAR SILICON

RELATED APPLICATION

The present application is a continuation application of Ser. No. 13/043,155, filed on Mar. 8, 2011, now pending issuance as a U.S. Patent, which is a continuation application of an International Application Number PCT/CN2009/072688 filed on Jul. 8, 2009, published as WO 2010/031270, on Mar. 25, 2010; which international patent application claims the benefit of priority, under 35 U.S.C. §119 to Chinese Patent Application Serial Number 200810160997.1, filed Sep. 16, 2008; Chinese Patent Application Serial Number 200810187430.3, filed Dec. 28, 2008; and Chinese Patent Application Serial Number 200910149144.2, filed Jun. 17, 2009, the entire contents of which are incorporated herein by reference in their entirety.

FIELD OF THE INVENTION

The present invention relates to high purity silicon production technology. In particular, it is directed to reactors and methods for producing high purity granular silicon.

BACKGROUND OF THE INVENTION

In the past, high-purity silicon material was primarily used for the production of semiconductor components. With the development of semiconductor integrated circuit technology, the integrated circuits have become smaller. Thus, the consumption of high-purity silicon has not been significantly increased even though there are more electronic devices on the market.

The demand for high purity silicon has grown significantly in solar photovoltaic industry in recent years as the high purity silicon is also an important raw material of solar photovoltaic cells. The demand in the solar photovoltaic industry has now exceeded the demand in the semiconductor industry. However, the profit margins for solar photovoltaic industry are very small. It is imperative to reduce the cost of high-purity silicon material production. The high cost has made the traditional methods of production a great challenge.

Traditional methods of producing high purity silicon include the Siemens method and the fluidized bed method. The Siemens method includes a process of introducing the purified silicon containing gases such as trichlorosilane ($SiHCl_3$) or silane ($SiH_4$) and hydrogen gas mixture into a reactor, inducing a thermal decomposition reaction on the surface of hot mandrel and continuously thickening the high purity silicon by deposition of silicon on hot mandrel surface, and returning the exhaust gas into the treatment system for separation and recycling. When the diameter of the silicon mandrel grows to a certain point, the reaction has to be terminated and the silicon mandrel is replaced for the next round of reaction. The process involves intermittent operation and requires high energy consumption. One kilogram of high-purity silicon consumes 150 kwh on average or even higher. In addition, there are other disadvantages such as low efficiency. The production of high purity silicon by the Siemens method leads to low yield and high cost and it will not meet the growing needs from the solar industry.

The fluidized bed process includes heating high purity granular silicon seeds in a reactor, introducing high-purity silicon containing gas into the reactor; inducing thermal decomposition on the surface of the seeds so that high purity granular silicon grows bigger and bigger and precipitates in a collection box. As the fluidized bed process uses a large quantity of high purity granular silicon seed, the entire surface area is relatively large compared to Siemens method. The reaction efficiency and conversion efficiency are greater than for the Siemens process; and the power consumption is also reduced. Nevertheless, certain issues remain with the conventional fluidized bed method including the following.

1. High purity silicon granules formed in the suspended state separate from each other forming more than 80% free-space. Consequently, a large amount of silicon fine powders are formed from the decomposition of silicon-containing gas and are taken away with the reactor exhaust gas therefore reducing the raw material (gas) usage and increasing costs. Additionally, the silicon fine powders increase the difficulty of the treatment of the exhaust gas as well as the cost of equipment as the silicon powder enters the downstream process. The silicon fine powders also cause pollution.

2. In a fluidized bed reactor, suspending silicon particles, especially large sized particles, consume a large amount of gas in the reactor that results in the difficulty of gas recovery. In addition, it leads to low utilization of reaction heat and increased operating costs.

3. The surface of silicon granules is in a semi-molten state under the reaction temperature (200° C.-1400° C.). Due to the adhesion between particles, the semi molten state causes inter-particle agglomeration. Consequently, the reactor distributor pores, pipings and channels are easily plugged and result in cut-off accidents.

4. The cost of equipment is high and construction of equipment is difficult due to large reactor volume required, the less effective use of space. Only small-scale production is practical in operation.

5. The preparation of high purity granular silicon seed is difficult as it can be easily contaminated during the preparation.

SUMMARY OF THE INVENTION

The present invention is directed to reactors and methods for the production of high purity granular silicon. The reactors and methods disclosed in the present invention can be used to achieve large scale, efficient, energy saving, continuous, and low-cost production of high purity silicon granules.

The invention provides a reactor for the production of high purity granular silicon particles, including:

A reaction chamber;

A solid feeding port, auxiliary gas inlet, raw material gas inlet, and exhaust export are installed on the reactor chamber;

A gas distributor, used for the dispersion of auxiliary gas and raw materials gas, is installed in the reactor chamber;

At least one internal or external preheating unit is installed in the reactor chamber; and one or more exhaust gas processing units are installed outside the reactor chamber connecting to the preheating units and inlets for the auxiliary gas and raw material gas;

An internal or external surface finishing unit is connected with the reactor chamber. The surface finishing unit is used for the surface treatment of the high purity silicon granules;

The reactor chamber is equipped with internal or external heating mechanism and dynamics generating units. The dynamics generating units are used to create relative motion between high purity granular silicon in the high purity granular silicon bed layer inside the reaction chamber to avoid sintering.

The reactor chamber is equipped with a sieving unit and a seed generating unit. The sieving unit sorts silicon granules with desirable size and the seed generating unit breaks some large granules into small ones and adds them into the reactor chamber to provide new surfaces for silicon deposition.

One embodiment of the present invention also provides a method of producing high purity granular silicon particles, including:

Forming a high purity granular silicon bed layer with densely packed (stacked) high purity granular silicon, with a fill rate greater than 10%;

Heating the high purity granular silicon bed to a temperature in the range of 100°-1400° C., wherein the high purity granular silicon particles are in relative motion with respect to each other inside the high purity granular bed layers;

Introducing auxiliary gas and raw material gas, wherein the auxiliary gas is high-purity $H_2$ gas and/or other inert gas such as Ar and He, and the raw material gas includes one silicon containing gas and reducing gas $H_2$;

Following the heat exchange of the exhaust gas of the reaction with supplemental high purity granular silicon, the exhaust gas components are separated and recycled into the reaction chamber through the inlet of auxiliary gas or the raw material gas. The supplemental high purity granular silicon is introduced into the reactor for further deposition on the granule surfaces.

During the operation, large granules are removed from the reactor and smaller "seeds" are added into the reactor to balance the total surface area for silicon deposition.

After treating the surface (surface finishing) of high purity granular silicon particles the particles are then collected for packaging after cooling.

Embodiments of the present invention provide a reactor and a method for producing high purity silicon granules. The use of a densely stacked high purity granular silicon bed layer with the granular silicon particles in relative motion with respect to each prevents the adhesion between the granular silicon particles and therefore reduces the volume of the reactor. The densely stacked high purity granular silicon bed also captures high purity silicon fines as seeds. It also utilizes the reaction heat from exhaust gas for the heating of supplemental granular silicon. Therefore, the method can achieve large scale, efficient, energy saving, continuous, and low-cost production of high purity granular silicon.

DETAILED DESCRIPTION OF THE INVENTION

Detailed description and implementation of the present invention is further described in combination with the drawings and examples.

Figure 1:
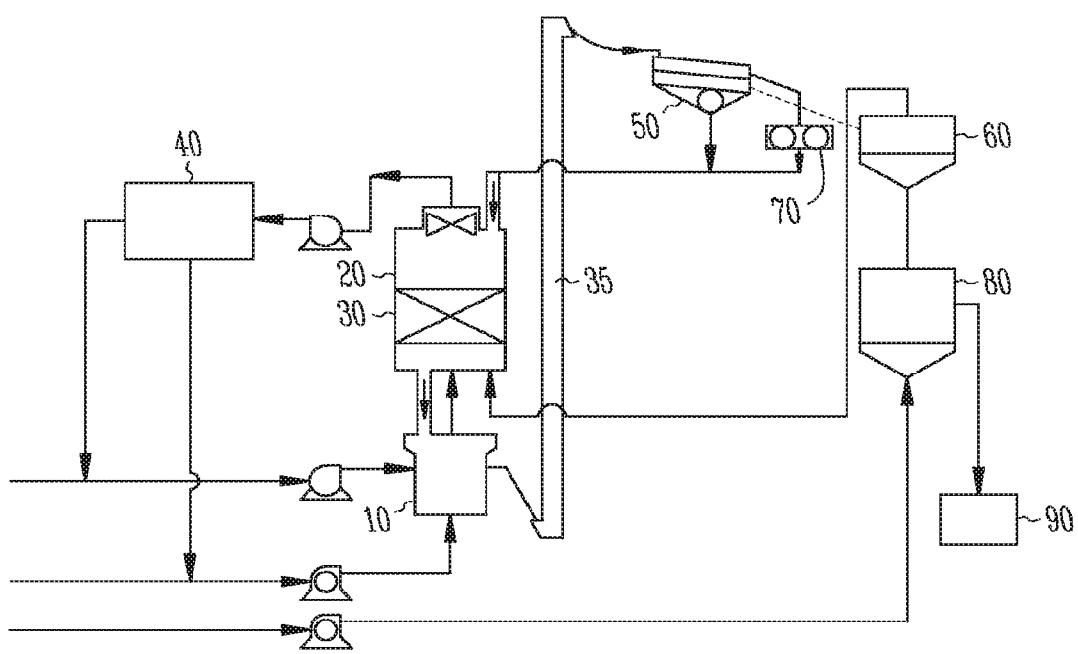
FIG. 1 is a schematic view of a reactor for the production of high purity granular silicon.
Figure 2:
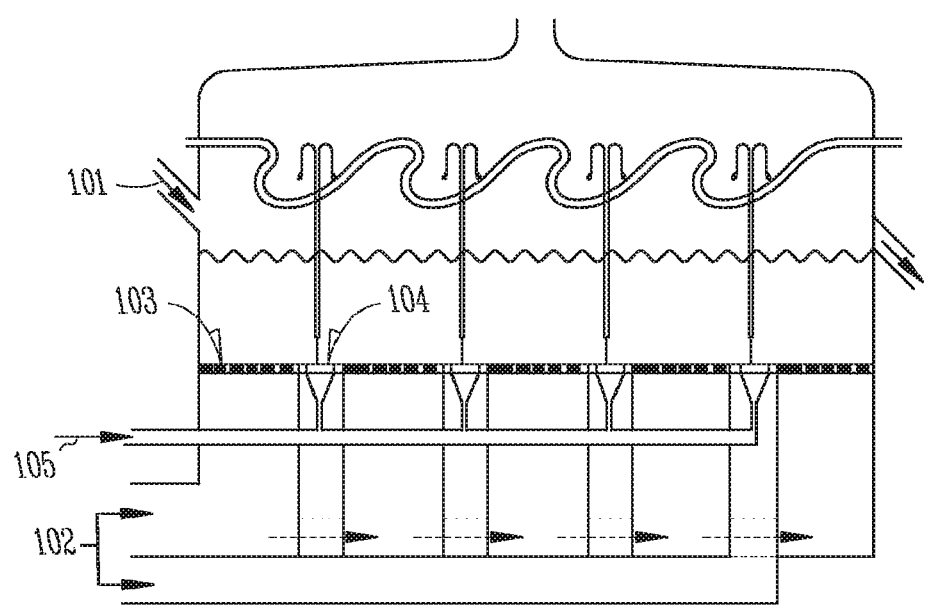
FIG. 2 shows a schematic view of an exemplary reaction chamber for the production of high purity granular silicon.

Examples of reactors for producing high purity silicon particle are provided in FIGS. 1 and 2. FIG. 1 illustrates a schematic diagram of a reactor for the production of high purity granular silicon; and FIG. 2 shows an exemplary diagram of a reaction chamber for the production of high purity granular silicon. As shown in FIG. 1 and FIG. 2, the device includes a reactor chamber 10, preheating unit 20, exhaust gas processing unit 40, surface finishing unit 60, heating unit, and dynamics generating unit.

The shape of the reactor chamber 10 can be square, cylindrical, rectangular or other shapes. The reaction chamber can be layered or segmented. The reactor chamber 10 can be set upright (vertically), tilted or flat (horizontally), wherein co-flow (or, co-current, gas and solid are in the same direction) or anti-flow (gas and solid travel in the opposite directions) or cross-flow (the gas travel at any angle between 0 and 180 degrees with respect to the solid flow) operations can be applied during operation. When the reactor chamber is placed upright or tilted, the height of the reactor chamber is about 1-100 m, preferably 1-50 m. For example, when the height of reactor chamber is 1 meter, the reactor can be one or multi-levels. The height of each level is at least 10-20 cm. When the height of reactor chamber is 50 meters, the reactor can be one or multiple levels. The height of each level can be different. If it is a multi-level reactor, the height of each level is at least 10-20 cm. The height of the reactor can be fixed, for example, at 50 meters. The height of each level can be set according to reaction levels. If the reactor is one level, the height can be set for 50 meters. If the reactor is five levels, each level can be 10 meters high. Similarly, when the height of the reactor chamber is 70 meters or 100 meters, the reactor can also be one level or multiple levels. The height of each level can be set according to the required reaction levels. It can also be set with the proportion of a small size reactor (such as reactor chamber height of 1 meter or 50 meters). It can also be stacked with multiple small-size reactors. The size of the reaction chamber can be determined by the actual condition of the reaction with the goal of making the reaction gas most efficient in conversion and energy saving when the gas is introducing through the reaction bed. The present invention is not limited to the height of the reactor chamber. For example, the height of the reaction chamber can be 1-1000 meters. When the reactor chamber is flat, then the length of the reaction chamber can be 1-100 meters, preferably 1-50 meters. The length of the reactor chamber is therefore similarly described to the height of the reaction chamber. However, multiple reactor chambers can be stacked horizontally in two dimensions and three dimensions over each other.

The reaction of high purity silicon production is an endothermic reaction. To ensure no heat loss or minimum heat loss, the shell of reactor chamber 10 can be composed of three layers. The inner liner is heat resistant material; the middle layer is heat resistant fiber and slag wool or other insulation material; and the most outer layer can be steel as support.

As shown in FIG. 2, the reaction chamber 10 is equipped with a solid feeding port 101, which is used to introduce high purity granular silicon seed to the reaction chamber 10.

Reaction chamber 10 is also equipped with auxiliary gas inlet 102, raw material gas inlet 105, and exhaust gas export. Auxiliary gas can be high purity reducing gas $H_2$ and/or other inert gas (such as Ar or He). Raw material gas can be high purity silicon containing gas or high purity silicon containing gases with reducing gas $H_2$. Silicon containing gas can be selected from $SiH_4$, $SiHCl_3$, $SiCl_4$, $SiH_2Cl_2$ and $SiBr_4$, etc. The purity of the gas used in the present invention (including raw materials gas and auxiliary gas) is above 99.99%. The composition of the silicon containing gas is 1% to 100% in the raw material gases.

Auxiliary gas inlet 102 leads the gas distributor 103 in the reaction chamber 10. Raw material gas inlet 105 leads to raw material gas nozzle 104. Auxiliary gas and raw material gas are dispersed through the gas distributor 103 of raw material gas nozzle 104 in the reaction chamber 10. High purity granular silicon seeds are densely packed in the gas distributor 103 through solid feeding port 101 (or, high purity granular silicon bed does not have to be accumulated in the gas distributor. It can rely on chamber diameter and material circulation rate to control the residence time of materials in the reaction chamber). The particle size distribution of high purity granular silicon seed can overlap with high purity granular silicon product. That is, particle size of a portion of high purity granular silicon seeds can be greater than or equal to the high purity silicon granules produced. Preferably, the particle size of high purity silicon seed is 10-30% of those of the high purity granular silicon produced. The particle size varies based on the application of different circumstances, usually in the 1-20 mm range. More specifically, the gas distributor 103 is composed of a flower-shaped porous plate (or sieve) and a hood component. It can also be one single flower-shaped plate (porous sieve) without the hood. Gas distributor 103 can be co-flow, cross-flow (shutter-like), close holes or silicon granule filled distributor. Due to the intensive accumulation of high purity granular silicon bed, the volume of the reactor is relatively small in the present invention. Compared with the existing fluidized bed technology, it can reduce the volume of the reactor and increase production.

Preheating unit 20 is equipped internally or externally of the reaction chamber. As shown in FIG. 1, the preheating unit 20 is installed externally of the reactor chamber 10. Solid feeding port is installed with the preheating unit 20 and it is used to supplement high purity granular silicon seed material since the invention requires consumption of seed during the production of high purity silicon granules and therefore the need to constantly supplement the seed of high purity granular silicon. Reaction exhaust gas is passing through preheating unit 20 to provide heating for the high purity granular silicon seeds.

Exhaust gas processing unit 40 is installed externally of the reaction chamber 10, and it is connected between the preheating unit 20, auxiliary gas inlet 102, and the raw material inlet 105. The exhaust gas is passing through the preheating unit 20 and entering into the gas processing unit 40. The component of the exhaust gas is separated in the exhaust processing unit 40. The isolated gas is then recycled to the reaction chamber through the auxiliary gas inlet or the raw material gas inlet.

Reaction exhaust gas may carry high purity silicon powder because of the following reasons. 1). High purity silicon granules and/or particles in the high purity granular silicon bed layer are in a disturbance and lead to particle abrasion during the process; 2). Silicon containing gas can produce silicon powder itself due to pyrolysis. The condensed high purity silicon particle bed layer in the reactor can capture silicon powder from the exhaust gas, thus playing a role of dust removal device and allow the exhaust gas to be recycled into the reaction chamber after passing through the preheating unit and the exhaust gas processing unit.

Surface finishing unit 60 is installed internally or externally on the reactor chamber 10. It is used to treat the surface of high purity granular silicon. The surface of high purity silicon granules tends to be loose and easy to produce dust, which will affect the downstream applications. It is therefore necessary to treat the surface of the high purity silicon granule to make it more compact. Surface finishing unit 60 preferably contains 0-10% of the low concentration reaction gas in the reaction chamber. It can be a number of sections in the reactor. In a low concentration (0-10%) gas spouted beds, the surface of high purity silicon granules can form dense surface structure of silicon, so as to achieve the surface treatment. This method can avoid impurities and other treatment processes, thus reducing production costs. Of course, the surface treatment process can also use the traditional pickling, cleaning, and drying process.

The heating unit is installed internally or externally on the reactor chamber 10. Reactants have to be heated in order to achieve the reaction temperature. The heating unit is preferably selected from electrical connection of the power supply with high granular silicon bed layer, i.e., the bed layer of high purity granular silicon is applied with voltage. Due to the semiconductor properties of silicon, high purity granular silicon bed layer is heated and the temperature is increased. Such method provides direct heating, high thermal efficiency, and high utilization efficiency. It can also help to prevent pollution and ensure the purity of the product.

The heating unit can also be many other existing heating technologies including: 1) direct heating using resistance wire (silicon ingots, high purity SiC, high purity SiN, or high purity graphite and other materials); 2) indirect heating by microwave, plasma, laser or induction and other methods; 3) indirect heat radiation from the flame across the combustion tube that can provide heating or rotary kiln; 4) using outer jacket and internal bed heating exchanger, the outer jacket heat exchanger can be used outside the jacket and the heat carrier heating inductor converter; bed heat transfer can be by heat induction, electrical induction, and electrode heating, etc.; 5) external heating methods, such as the reactants required in the reaction (e.g., suspended gas and silicon particles itself) are heated externally before introduced into the reactor; 6) Dual-formed reaction heat (coupling-reaction heating) by chemical reaction, such as chlorine ($Cl_2$) or hydrogen chloride (HCl) are added to the system.

In order to prevent the adhesion of high purity silicon granules in the production, the present invention includes a dynamics generating unit which creates relative motion for the high purity granular silicon in the high purity granular silicon bed layer. The dynamics generating unit is installed internally or externally on the reactor chamber 10. Preferably, the dynamics (motion) generating unit is auxiliary gas nozzle and/or raw material gas nozzle. The auxiliary gas nozzle and raw material gas nozzle are installed inside the reactor chamber 10, and they are connected with gas inlet of auxiliary gas and raw material gas respectively. It is used to inject auxiliary gas and raw material gas into the reaction chamber 10 and to stir the high purity granular silicon bed layer to induce high purity granular silicon in a state of relative motion, whereby avoiding the adhesion between high purity granular silicon acting as a gas-solid blender. As the raw material gas is injected right into high purity granular silicon bed, it results in less susceptible reaction with high purity granular silicon seed as it is near the gas distributor. Consequently, it avoids the gas distributor 103 to be plugged.

The dynamics generating unit can also facilitate the relative motion of the high purity granular silicon bed in the following ways. 1) introducing external forces such as spraying, turning, stirring, mixing, vibration, or making the high purity granular silicon bed flow under gravity through staggered wall comb structure; 2) subjecting the reactor to the other gravitational field (such as centrifugal force field, etc.); 3) the use of agitation bed; 4) the use of special bed (including mechanical vibration, acoustic or ultrasonic vibration, vibrators, etc.).

Furthermore, in order to better capture the high purity silicon powder in the reaction exhaust gas and to supplement high purity granular silicon seed, the present invention also includes gas-solid separation unit 30 in the reaction chamber. Gas-solid separation unit 30 is installed internally or externally of the reaction chamber 10 and it is connected with the preheating unit 20. The reaction exhaust gas from the reaction chamber 10 is discharged by the gas-solid separation unit 30 to capture high-purity silicon powder. The high purity silicone powder is then returned to the reaction chamber 10 as seed in the reaction or kneaded with other silicon particles.

Preferably, the gas-solid separating unit 30 is densely packed high purity granular silicon bed layer (with fill rate greater than 50%, preferably 50-80%). For example, the high purity granular silicon particles can also be densely stacked within multiple silicon tubes (or ceramic tube) with pores. The silicon tubes can be covered with quartz glass fabrics externally; and they can be suspended in an array onto an expanded section at the top of the reaction chamber or outside the chamber. Reaction exhaust gas is introduced into separation unit with dense layer of high purity granular silicon particles. The high purity silicon powder can then be captured in the process using the gas-solid separation unit. Not only does it prevent the drifting of high purity silicon powder into the reaction downstream; but also it creates a simple, and a clean production of high purity granular silicon seed. In such process, the filling ratio is the ratio of space taken by high purity granular silicon particles and its fill space. Filling rate is dependent on particle shape and particle size distribution. Filling rate is not specific to the entire reaction chamber. For example, when the filling ratio is 70%, the reaction chamber can be filled only by 20%.

Of course, the gas-solid separation unit 30 can also use other forms to achieve the same effect, such as: 1) by changing the internal diameter of the reactor and enlarging the top section of the reactor to alter the escape velocity of small particles and collection of the particles by sedimentation; 2) The use of cyclone separation unit; 3) the use of filter or dust collector.

In order to produce uniform particle size of the high purity silicon granules, the reactor of this invention may also include a particle screening unit 50. Screening unit 50 is installed internally or externally on the reaction chamber 10; it is connected between the reactor chamber 10 and the surface finishing unit 60. The high purity silicon granules are imported into the screening unit 50. Large granules are grinded and are then sent to the heating unit 20 with small particles. The silicon particles continue to grow in the reaction chamber. The desired particle size of high purity silicon granules are selected and are sent into the next processing steps. The resulting particle size of the product can be controlled at the optimum range. Not only does it reduce the possibility of surface contamination (granules tend to be contaminated due to its larger surface area); but also it is advantageous for the downstream application. In the process of screening and recycling, it is desirable to avoid direct contact between high-purity silicon particles and other non-silicon materials, especially metal in order to prevent pollution and to maintain the quality of the product.

In order to provide other methods to add high purity granular silicon seed, the reactor of this invention can also include the pulverization device 70. The pulverization device 70 is connected between the particle screening unit 50 and heating unit 20. It is used for the grinding process for the portion of the large particles separated from the screen unit.

The high purity granular silicon seed is in a constant consumption during the production process. When high purity silicon powder separated out by gas-solid separating unit 30 in the reactor is not sufficient for the consumption of the seed, the grinded large particles of high purity silicon through the pulverization device 70 can be returned to the reaction chamber 10 through the heating unit. Since the particles of high purity silicon produced by the disclosed method contain hydrogen, they can be heated quickly in a vacuum or high purity inert gases such as Ar, He, and N(2) by the pulverization device to burst formation of small particles as seeds. The pulverization device 70 can also be a high-speed gas breaker, ultrasonic breaker, or dust collector (cyclone, baghouse), etc.

In order to reduce the deposition of silicon particles on the reaction chamber wall, the reaction chamber can also include a gas curtain unit (through or not through the wall) tangential to the inner wall of the reaction chamber. The unit is used as a gas curtain to cover the wall of reaction chamber. Specifically, the gas curtain may include a ventilation port that is cut into multiple strips with small angles with the inner surface on the reaction chamber wall. The strips of ventilation port can be horizontal or vertical. The non-silicon containing gas (inert gas) is introduced externally into the reaction chamber, and it can create a gas curtain tangential to the inner surface of the chamber wall in the reaction chamber. The gas curtain can prevent the deposition of silicon particles from the silicon containing gas on the wall of the reactor chamber. The gas curtain can also be a circular tube connecting the bottom or top section of the reaction chamber and the external non-silicon gas (inert gas) pipe. The circular tube contains multiple strips that are parallel to the wall of the reaction chamber. When the non-silicon containing gas is introduced through circular tube, it forms a gas cover between the reaction chamber wall and the inner surface of the wall. The gas curtain can prevent the deposition of silicon particles from the silicon containing gas on the reactor wall.

The present invention can also include a solid recirculation system coupled with a monitoring and central control system. Every step of the process can be recorded with specific process parameters. When specific process parameters exceed the normal range, it will issue a warning and be automatically adjusted. The required parameters for the process include: bed temperature (including gas and solid temperature), the export gas (reaction exhaust gas) composition, pressure, solid particle size, bed density, heat and mass transfer, and the circulation of solid particles.

The reaction chamber and heating unit of the present invention can be horizontal or vertical with multi-level (stage) and multi-dimensional structure (see FIG. 2, the gas nozzle can be multiple and set in a two-dimensional array). The reaction level can be 1-50, preferably 1-20, and most preferably 3-10 to increase the effective reaction time and heat transfer efficiency, and to reduce the silicon powder being taken out and to reduce the reactor size and construction cost. When the reaction is multi-level, the remaining heat of exhaust gas in each level can be used to heat the next level of high purity granular silicon particles. Consequently, heat transfer efficiency and the effective reaction time are increased. For example, when the reaction is 3 levels, the heat transfer efficiency is improved by 60% and the effective reaction time increased by 3 times. When the reaction is 6 levels, the heat transfer efficiency is improved by 80% and the effective reaction time is increased by nearly 6 times.

Figure 3:
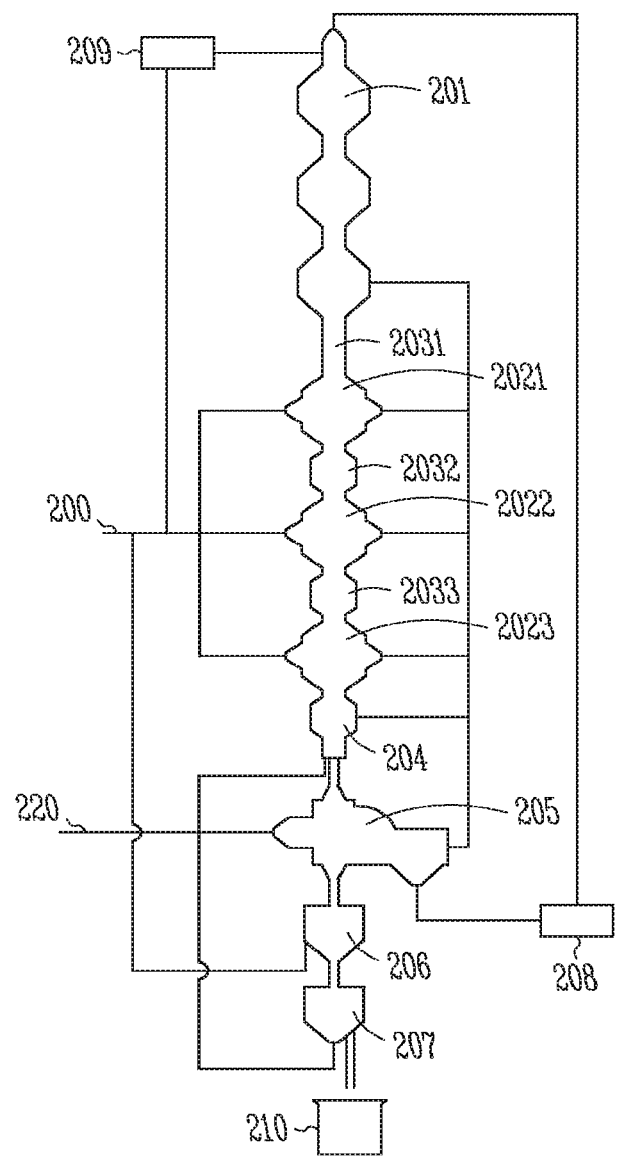
FIG. 3 shows a schematic view of an example of a vertical multistage reactor diagram of a reaction system for the production of high purity granular silicon.

FIG. 3 shows the schematic diagram of a multi-level reactor. The process is described as the follows. High purity granular silicon seed is preheated gradually from the heating unit 201 at the top of the reaction chamber by the multi-level reaction exhaust gas. When the high purity granular silicon seed is heated to the desired temperature by the preheating unit and the first stage heater 2031, it enters into the first level reactor 2021 (shutter-like gas distributor on the left and the right sides are not shown) and reacts with the silicon containing gas. Silicon are grown on the surface of the high-purity granular silicon seed of their own. The temperature of high purity granular silicon seed becomes lower due to the endothermic decomposition reaction. The high purity granular silicon seed is then introduced into the second level heater 2032 and the second stage reactor 2022 for reaction. In the similar manner, high purity granular silicon seed is introduced again into the third stage heater 2033 and the third stage reactor 2023 for reaction. Following multi-level reaction, the particle size of high purity silicon grows gradually.

Additional clarifications are provided as follows.

Firstly, the flow direction of the reaction gas can be perpendicular to the flow of the particles. It can also be presented to any angles. Secondly, the residence time can be controlled by the diameters of reaction chamber and the material circulation rate at every level of reaction. Thirdly, silicon powder can be produced at all levels of reaction. A portion of the silicon powder can be carried into the next level heating unit and then eventually be graded in the gas-solid separation unit (with densely stacked high purity granular silicon bed layer). The silicon powder will be stopped and react along with the high purity silicon as new seed for the next level of reaction. Fourthly, a portion of high purity silicon powder can be carried with granular silicon down to the kneading reactor 204. The powder silicon is kneading onto the bigger particles of high purity granular silicon surface in low concentration silicon gas or in the absence of non-silicon containing gas (i.e., in the presence of inert gas); making high purity granular silicon particles further grow up into a rounded shape. The process avoids large amounts of dust when the high purity silicon powder enters into the particle screening device 205 and results in less operation difficulties in the follow-up process. After screening process of high purity silicon granules in the particle screening device 205, larger particles enter into the surface finishing unit 206, wherein the surface of high purity silicon granules are densely coated or ground polished with the lower concentration of silicon containing gas or inert gas so that surface of each high-purity silicon particle is bright and clean. High purity silicon granules with finished surface are cooled off by the cooling unit 207 and enter into packaging unit 210 for packaging. Smaller particles screened out by the screening unit 205 are introduced into the transportation unit 208 to return to the heating unit 201, thus completing the cycle. The exhaust gas from the primary preheating unit 201 is cooled to a lower temperature such as 100-200° C. Exhaust gas contains less silicon powder because of the filtration process of various heating units. After being separated from the exhaust separating unit 209, high purity gas is mixed with raw material gas and returned into the reactor; thus completing another cycle. The first channel 200 is inlet for raw material gas; the second channel 220 is inlet for the auxiliary gas.

To reduce or avoid pollution of the silicon material under high temperature, the equipment for the reactor has to be sufficient in mechanical strength. The present invention provides that the equipment material for the reactor is selected from high purity silicon, high purity silicon carbide, high purity silicon nitride, quartz or graphite, which will not diffuse impurities into the reaction at high temperature.

In the present invention, the reactor, heating units and other units can be strategically arranged or directly connected. That is, heating unit, filters, reactors, kneading units and surface finishing units can be installed in different sections within the reaction chamber. It is also possible to separate the reactor with the heating unit. Specifically, one set of heating unit can be installed with a number of reactors. When one reactor is under maintenance, the others can continue to be operated with less cut-off lime.

Operation procedures for producing high purity silicon granules are further described in combination with FIGS. 1 and 2.

Before the first start of the reaction, high purity granular silicon seeds are introduced through solid feeding port 101. High purity granular silicon seed will be naturally accumulated to form a dense layer of high purity granular silicon bed layer; and it is heated by the heating unit to the desired reaction temperature.

High purity reactive gases (silicon containing gas and reducing gas $H_2$) are mixed under the pump pressure and are injected through jet nozzle 104 into the high purity granular bed layer. At the same time, auxiliary gas hydrogen and/or inert gas are introduced into reaction chamber 10 by a pump from the auxiliary gas inlet 102 through the gas distributor 103. The reaction takes place inside of the reaction chamber, wherein silicon containing gas undergoes thermal decomposition process and form silicon layer on the surface of high purity granular silicon seed. The high purity granular silicon seed keeps growing gradually. The exhaust gas is emitted from reaction chamber 10 into heating unit 20 and gas-solid separation unit 30. Silicon powder in the exhaust gas is separated and collected by gas-solid separation unit 30. The exhaust gas with remaining heat is returned into heating unit 20 to provide heating for silicon particles and silicon powder. The heated high purity silicon granules are returned to the reaction chamber 10 for the reaction. The exhaust gas emitted from the heating unit 20 is introduced into the exhaust treatment unit 40, and it is separated by its components. The isolated gas is then recycled into reaction chamber through the inlet of reaction gas or auxiliary gas. High purity silicon granules (relative large particle size) from the reaction chamber 10 are taken into screening unit 50 through a transmission unit 35. Particles with desired particle size out of the screening unit 50 is treated inside of the surface finishing unit 60, it is then cooled off by cooling unit 80 to proceed with packaging in the packaging unit 90 to complete the production process. Smaller high purity silicon granules separated out of the screening unit 50 are heated by the heating unit 20 to return to the reaction chamber 10 for the reaction again. If there is insufficient high purity granular silicon seed in the process, a portion of larger particles separated from the screening unit 50 is taken into high purity silicon pulverization device 70. Large particles are grinded in pulverization unit 70 and heated by a heating unit. They are then returned to the reaction chamber as high purity granular silicon seed.

To facilitate understanding, the present invention provides separate descriptions on the reaction chamber, gas-solid separating unit, heating unit, screening unit, and surface finishing unit et al. In actual production, all the units can be combined in one set in a reaction chamber.

The present invention provides reactors for the production of high purity silicon granules. The method provides relative motion of the densely stacked high purity granular silicon bed layer, which avoids adhesion between the particles and reduces the volume of the reactor. The method further provides collection of high purity silicon powder in the densely stacked silicon bed from the exhaust gas to be used as seed. The method further provides that the reaction heat of exhaust is used to supplement heating of high purity granular silicon seed; therefore achieving large scale, efficient, energy saving, continuous, and low-cost production of high pure silicon particles.

Example 1

Implementation of the present invention: reactor and method of producing of high purity silicon granules.

See FIGS. 1 and 2, the example provides reactor and method for the production of high purity silicon granules, including the following steps.

High purity granular silicon seed is introduced into reaction chamber 10 from the solid feeding port 101 to form high purity granular silicon bed layer. High purity granular silicon seed in the high purity granular silicon bed is densely distributed with fill rate greater than 10%, preferably more than 50%. To reduce free space between high purity granular silicon particles in the silicon bed, various methods can be applied such as high pressure, spouted bed and downstream operations with moving bed. The specific measures may include: 1) increasing gas velocity through the control valve, using more fine-grained particles, so that changing bubbling bed into a turbulent bed; 2) improving the particle size structure by optimizing and selecting desired high purity granular silicon particle size and particle size distribution, so that it forms a solid condensed-type fluidized bed in loose style; reducing average particle size, widening particle size distribution, or increasing content of smaller particles to improve flow quality, increasing bed layer expansion, increasing two-phase exchange capacity, reducing short circuiting, and possibly eliminating the need for internal components; 3) using high pressure, a pressure higher than atmospheric pressure can not only increase capacity, but also reduce the density difference between solid and gas; 4) using high flow of fine particles can reduce back mixing, improving the efficiency of two phase contact, enhancing heat transfer, and increasing production capacity; 5) circulating gas spout internally, building circulatory system in the reactor, so that particles and silicon bed layer are more condensed but do not plug the tube; 6) moving bed (vertical and horizontal, and tilt) to increase the packing density of particles and to reduce the free space thus reducing gas powder production and accelerating the powder aggregation.

High purity granular silicon bed layer is heated at temperatures 100° C.-1400° C., preferably 300° C.-1200° C. The heating method can be electrical connection of high purity granular silicon bed with power supply, that is, to add voltage on high purity granular silicon bed by using heat released from electrical resistance of silicon itself. Similarly, Siemens method can be used wherein high-purity silicon rods are heated electronically. To reduce adhesion of silicon particles during the production of high purity silicon granules, it is necessary to create a state of relative motion of high purity granular silicon in the high purity granular silicon bed layer. The following methods can be used to make high purity granular silicon in a state of relative motion: 1) injecting the auxiliary gas and/or raw material gas into the reaction chamber 10, to make the high purity granular silicon bed is motion; 2) introducing external force such as spraying, turning, stirring, mixing, vibration or gravity flows et al; 3) subjecting the reactor to the other gravitational field (such as centrifugal force field, etc.); 4) using mixing bed; 5) using vibrating bed (including mechanical vibration, sonic or ultrasonic vibrations, plug-in vibration, etc.).

Auxiliary gas and raw material gas are imported through the auxiliary gas inlet 102 and raw material gas inlet 105 and gas distributor 103. Auxiliary gas is $H_2$ and/or inert gas; raw material gas is silicon containing gas or silicon containing gas with reducing gas $H_2$. The pressure in the reactor chamber 10 is 0.1 to 100 bars, preferably 0.1-50 bars.

The flow of auxiliary gas and raw material gas is not restricted by the minimum float velocity limit of traditional fluid bed. Gas flow can be less than the critical fluidization velocity (Umf); gas flow rate can be even controlled between 0.01 Umf-10 Umf for co-current flow. The method can bring the following benefits: saving gas flow; reducing heating and energy loss, and reducing pollution. The present invention provides a large variety of operation range in the production. The amount of gas can be more or less. The production does not have to be discontinued due to temporary shortage of raw material gas.

The reaction exhaust gas is heated by preheating unit 20 and supplemented as high purity granular silicon seed. The heated silicon particles are returned to reaction chamber 10.

The heated reaction exhaust gas is separated through exhaust processing unit 40. The separated components of the gas are recycled into the reaction chamber 10 through the auxiliary gas inlet 102 and raw material gas inlet 105. When exhaust gas is recycled into the reaction chamber 10, it goes through the high purity granular silicon bed layer. The high purity silicon powder in the exhaust gas can be captured by the high purity silicon bed as a dust collector. That is, the high purity silicon powder will be collected and returned as high purity silicon seed when the exhaust gas passes through the high purity silicon bed layer.

The high purity silicon particle product is treated by surface finishing unit 60 and collected after cooling. The surface treatment process can involve passing the high purity silicon product through the reaction chamber with low concentration of raw material gas at 0-10%; making the surface structure of the high purity silicon granules more compact.

Furthermore, in order to better capture the high purity silicon powder in the exhaust gas to be used as supplemental high purity granular silicon seed, the present invention also provides the following methods. The high purity silicon powder is separated from exhaust gas in the gas-solid separating unit 30. The process can also be by passing the exhaust gas through the condensed high purity granular silicon bed (fill rate greater than 50%) to separate out the high purity silicon powder. Not only does it prevent the high purity silicon powder into downstream reaction; but also it is a simple and clean production of high purity granular silicon seed.

In order to produce uniform particle size of high purity silicon granules, the present invention also includes the following methods. The larger particles of high purity granular silicon are transmitted into screening unit 50 through a transmission or conveyor unit. Particles that meet requirements of particles size specification of high purity granular silicon through sieving are collected; while particles that do not meet the requirements are returned to reaction chamber after heating. The method provides effective control of optimum particle size range of the product. It not only reduces the possibility of surface contamination (small particles can easily be contaminated due to large surface area); but also be more conducive to downstream production. It is necessary to avoid direct contact of silicon particles and other types of material, especially metal, in order to prevent contamination from impurities that affect the product quality. The present invention provides high purity granular silicon of particle size in the range of 1 mm-20 cm, preferably 3 mm-5 mm. Crystal size is no more than 30% of particle size, preferably 1-500 nm. Crystal size is the dimension of small single crystals in the particle. For example, 2 mm polycrystalline particles can include a number of small single crystal particles of different size (1-500 nm). The density of high purity silicon granules produced by this invention is optimally in the range of 1-2.4 g/cm3.

Furthermore, when there is still insufficient amount of high purity silicon seed in reaction chamber 10 after being supplemented from gas-solid separating unit 30, the following methods can be used to supplement the seed. A portion of large particles of high purity silicon screened out is imported into pulverization device 70 for breaking down into smaller pieces. It can then be returned to reaction chamber 10 as seed after heating.

The present invention provides that production of high purity silicon granules with reaction levels 1-50; preferably 1-20; most preferably 3-10.

In the production of high purity granular silicon, the following methods can be adopted for transmission or handling of materials.

1. Gravity Flow Method.

The method relies on the gravity of the solid particles itself to flow in and out of reaction bed layer. To facilitate the flow of the solid particles, a small amount of gas can be introduced to the appropriate section of the pipeline to loosen up the solid particles.

2. Mechanical Transmission Method.

The commonly used machine include screw conveyors, belt feeder, round plate feeder, star-shaped feeder and bucket feeder, etc.

3. Pneumatic Transport Method.

The present invention provides relative motion of densely stacked high purity granular silicon bed layer. It prevents the adhesion between particles and reduces the volume of the reactor. It utilizes the densely stacked high purity silicon bed layer to capture the silicon powder to be used as seed. It also utilizes the reaction heat from exhaust gas to supplement heating of high purity granular silicon, therefore achieving large scale, efficient, energy saving, continuous and low cost production of high purity silicon granules.

Example 2

The following is an example of the production of high purity granular silicon by the present invention.

10 kg high purity granular silicon seen with diameters in the range of 0.1-2.0 mm was imported into a drum-shaped reactor with 15 cm diameter. The reactor was heated by medium frequency electric furnace. The high purity granular silicon seeds in the reactor were stirred by a multi-blade mixer to make the silicon particles in relative motion inside of the densely stacked high purity granular silicon bed. When the temperature reached 600° C.-680° C., silicon containing gas silane with concentration of 50%-70% was imported into the reactor. The reaction time was 6.5 hours. The weight of silicon particles in the reactor was weighed at the end of the reaction. Total weight was increased by 4.35 kg. The production of 1.0 kg silicon consumed 3.45 kw power on average. The conversion rate of silane was 98%.

Table 1 shows the comparison of experimental data from two different reactors that produce high purity silicon granules. Data of Experiment 2 was from Example 2.

TABLE 1

Experimental Data from Two Different Reactors

|  | Experiment 1 | Experiment 2 |
|---|---|---|
| Reactor | Loose spouted bed | Condensed Stir-bed |
| Temperature (° C.) | 600-680 | 600-680 |
| Composition of silane in argon (%) | 10 | 50-75 |
| Total weight increase of silicon particles (g) | 990 | 4350 |
| Reaction time (hours) | 10 | 6.5 |
| Silane conversion efficiency (%) | 79.5 | 98 |
| Power consumption per kg product (kwh/kg) | 12 | 3.45 |

Figure 4:
FIGS. 4 and 5 provide a cross-sectional view of optical micrographs of the high purity silicon granules produced by the claimed invention.
Figure 5:
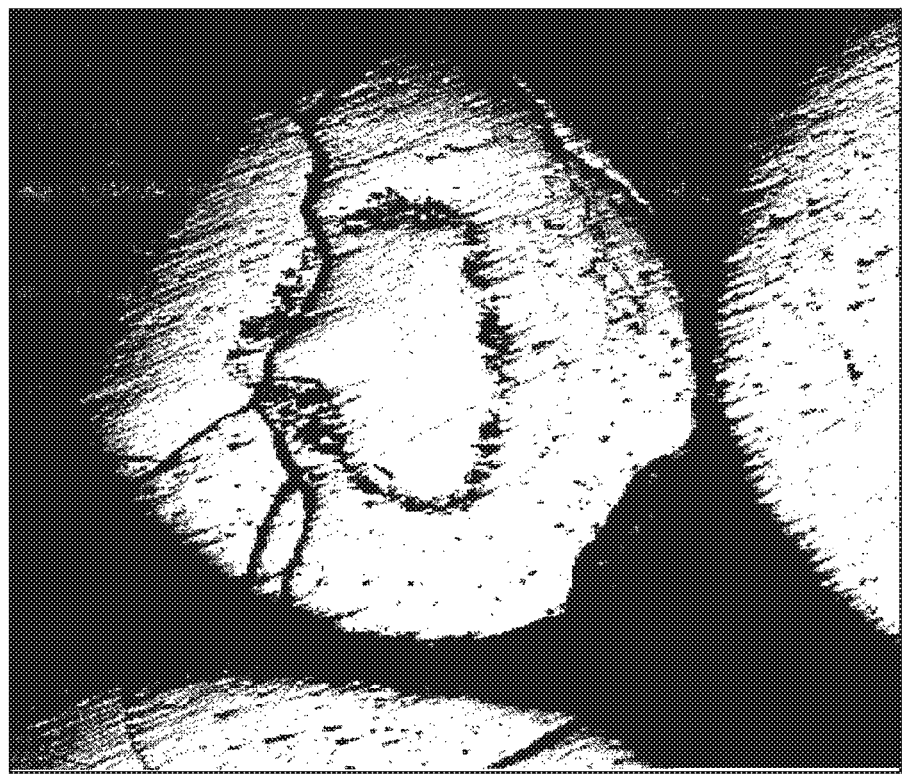

FIGS. 4 and 5 provide the cross-section optical micrographs of the high purity granular silicon product. It can be seen from FIGS. 4 and 5 that the first seed 401 and second seed 501 in the center of the high purity silicon particle; and the first growth layer 503 wrapped outside the seed layer. In FIG. 4, a large number of particulate 402 are visible between the first growth layer 403 and the first seed 401. The particulate 402 is silicon powder from gas-phase reaction. During the reaction, the silicon powder was deposited onto large silicon particles. It is described as kneading effect: kneading silicon powder into granular silicon. By depositing portions of silicon powder to granular silicon, it accelerates the reaction rate, increases efficiency and reduces overall energy consumption.

Figure 6:
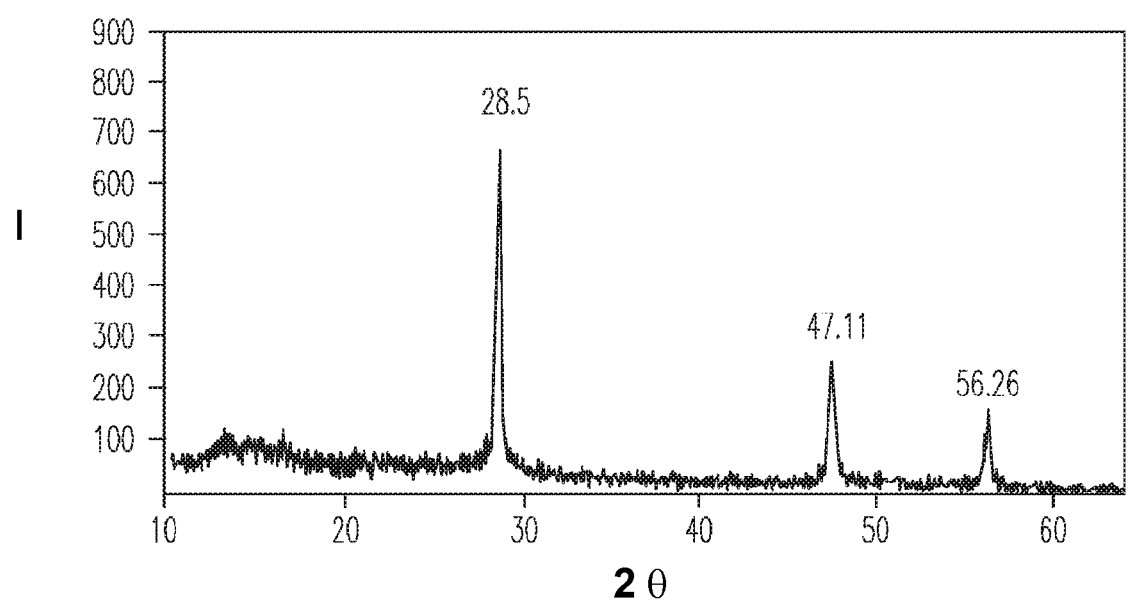
FIG. 6 shows a view of X-ray diffraction patterns of the high purity silicon granules produced by the claimed invention.

FIG. 6 provides X-ray diffraction pattern of the high purity granular silicon product of the invention. It can be seen from FIG. 6 that characteristic sharp lines for silicon crystal with half peak width at 0.12°), indicating that the crystal size is greater than 1.0 µm in the silicon particles produced by the method.

A neutron activity analysis was conducted for the high purity silicon granules and particles of commercial electronic grade silicon. Table 2 shows the heavy metal content in ppm (parts per million) for the silicon particle product of the invention vs. commercial electronic grade silicon particles. Table 2 demonstrates that impurity level is similar for the high purity granular silicon product from the instant invention and the commercial electronic grade silicon particles. Therefore, the production of high purity silicon granules of the present invention has reached the commercial standard of electronic grade silicon particles.

TABLE 2

Comparison of impurity levels of commercial electronic grade silicon particles and the silicon product from the present invention

| Element (ppm) | Commercial electronic grade silicon particles | Products of the Present Invention |
|---|---|---|
| As |  | $4.13^{-4}$ |
| Au | $2.75^{-6}$ | $1.16^{-6}$ |
| Ce | $3.08^{-3}$ | $2.60^{-3}$ |
| Ga | $3.33^{-4}$ | $3.87^{-4}$ |
| La | $1.90^{-5}$ | $3.68^{-4}$ |
| Mo | $3.71^{-3}$ | $2.33^{-3}$ |
| Sc |  | $3.76^{-5}$ |
| Sm |  | $1.74^{-5}$ |
| Th |  | $2.20^{-5}$ |
| U |  | $8.47^{-5}$ |
| W |  | $5.00^{-4}$ |

Example 3

For Trichlorosilane $SiHCl_3$ (TCS) Deposition on Granular Polysilicon

Figure 7:
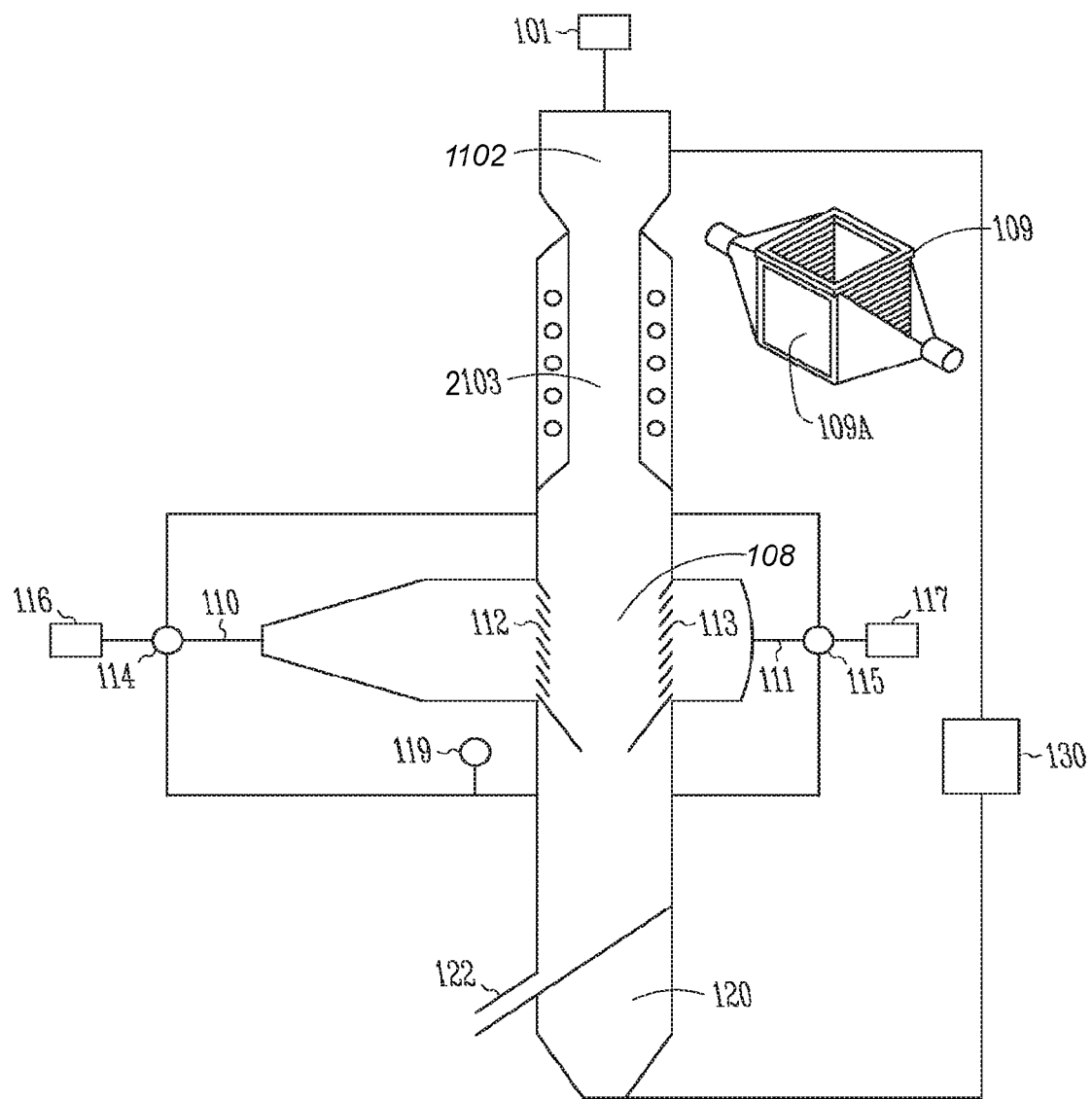
FIG. 7 shows a reactor system for granular polysilicon using silicon trichloride silane.

As shown in FIG. 7. the reactor has a top port 101 for addition of seeds, a collection chamber 1102 receives returning under sized granules from the bottom of the reactor via a transport system 130.

The granules travel downward and are heated in the heating section 2103, and when the heated granules reach the reactor chamber 108, chemical vapor deposition occurs mainly on the surfaces of the granules, making granules bigger and bigger. Once they leave the reaction chamber 108 (multiple sections or heating of the reactor is preferred), the granules are sorted by a sieving system 120. On-target sized granules exit through port 122 for cooling and packaging. Under sized granules return to the top of the reactor chamber 1102 via 130.

The reactor chamber 108 is shown in the insert, it has two shutter-like distributors at the opposite sides and two electrode plates 109 and 109a perpendicular to the distributors but parallel to the granule flow and the gas flow. By applying current between the two electrodes (prefer inert metal Mo, W, or just silicon) the granules are further heated to a temperature between 1100 to 1200 degrees Centigrade. Section 4 below shows the ways of making reactor chamber using polysilicon rods from conventional Siemens process.

Incoming gas TCS (trichlorosilane) and hydrogen mixture passes through a 3-way valve 114 and via line 110 to the left side distributor 112 of reactor chamber 108 and then decomposed on the surfaces of granules. The tail gas exit through the right side distributor 113. The tail gas is collected through line 111 by quenching and then pass through a second 3-way valve 115 and finally goes to tail gas treatment system for separation and reuse of hydrogen, TCS and STC (silicon tetrachloride) etc.

Figure 8:
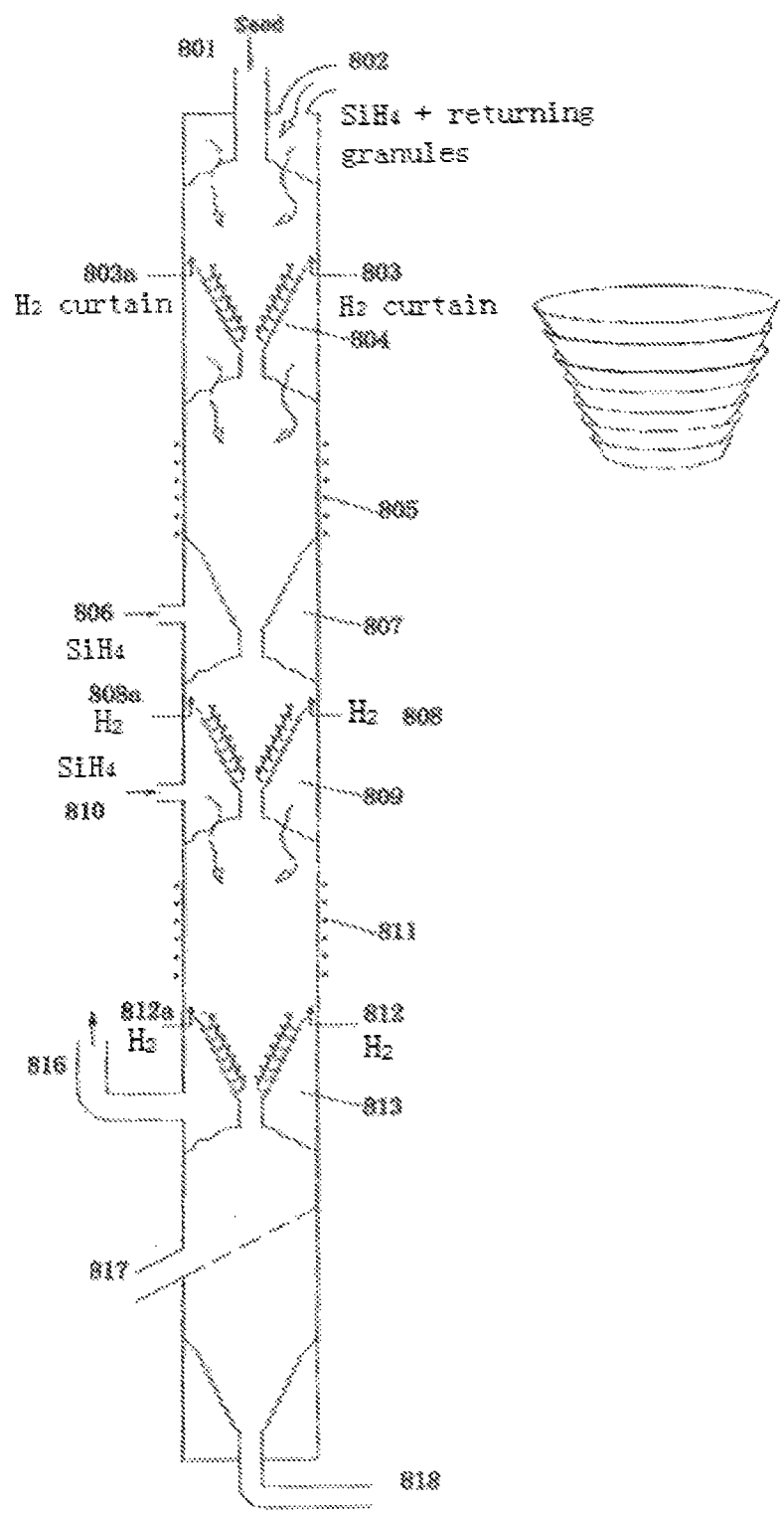
FIG. 8 shows a Reactor system for silane decomposition to form granular polysilicon.

As time goes on, the silicon gradually deposits on the left-side distributor 112 making the spacing narrower. On the opposite side, the tail gas containing hydrochloride HCl, gradually etch away the silicon on the right-side distributor 113, expanding the spacing. A pressure gauge 119 will monitor the pressure drop across the system between 116 and 117. Once it reached the preset level, the 3-way valves 114 and 115 will switch to allow incoming gas mixtures travel in line (with 119) to enter the reactor through 111. The tail gas exits via 110 and returns via line (top) then to 117 to the same tail gas treatment system. This will open the spacing of the left-side distributor. By repeating the procedure automatically, the reactor can be operated for a long time without interruption. Similarly, the same approach can be applied using a second reactor system shown in FIG. 8. For Silane Decomposition to Granular Polysilicon As shown in FIG. 8, seeds are added via port 801 and with hot returning granules, silane and hydrogen via port 802. The granular bed moving downward along with all gases. Silane is completely decomposed before reaching distributor 804 (circular structure is shown on the right, it can be square or other shape so as the gas and solid will be separated at the lower portion). Hydrogen stream 803, 803a, 808, 808a, 812 and 812a will create a curtain on the internal surface and the chamber to prevent the silicon deposition on the wall.

The granules and gas travel downward to a heating zone 805 to increase temperature of the bed. Additional silane is added via port 806 for further deposition and growth of the granules after distributors 807 and 809.

Further addition of silane via 810 and heating by 811 adds more deposition to granules; while silane is completely decomposed before reaching distributor 813; and pure hydrogen gas leaving 813 via 816 is for reuse or other operation for silane production. Granules are sorted by a sieving system 817 and returned through port 818 as shown in FIGS. 7 and 8. The system is usable for TCS decomposition as described herein.

Figure 9:
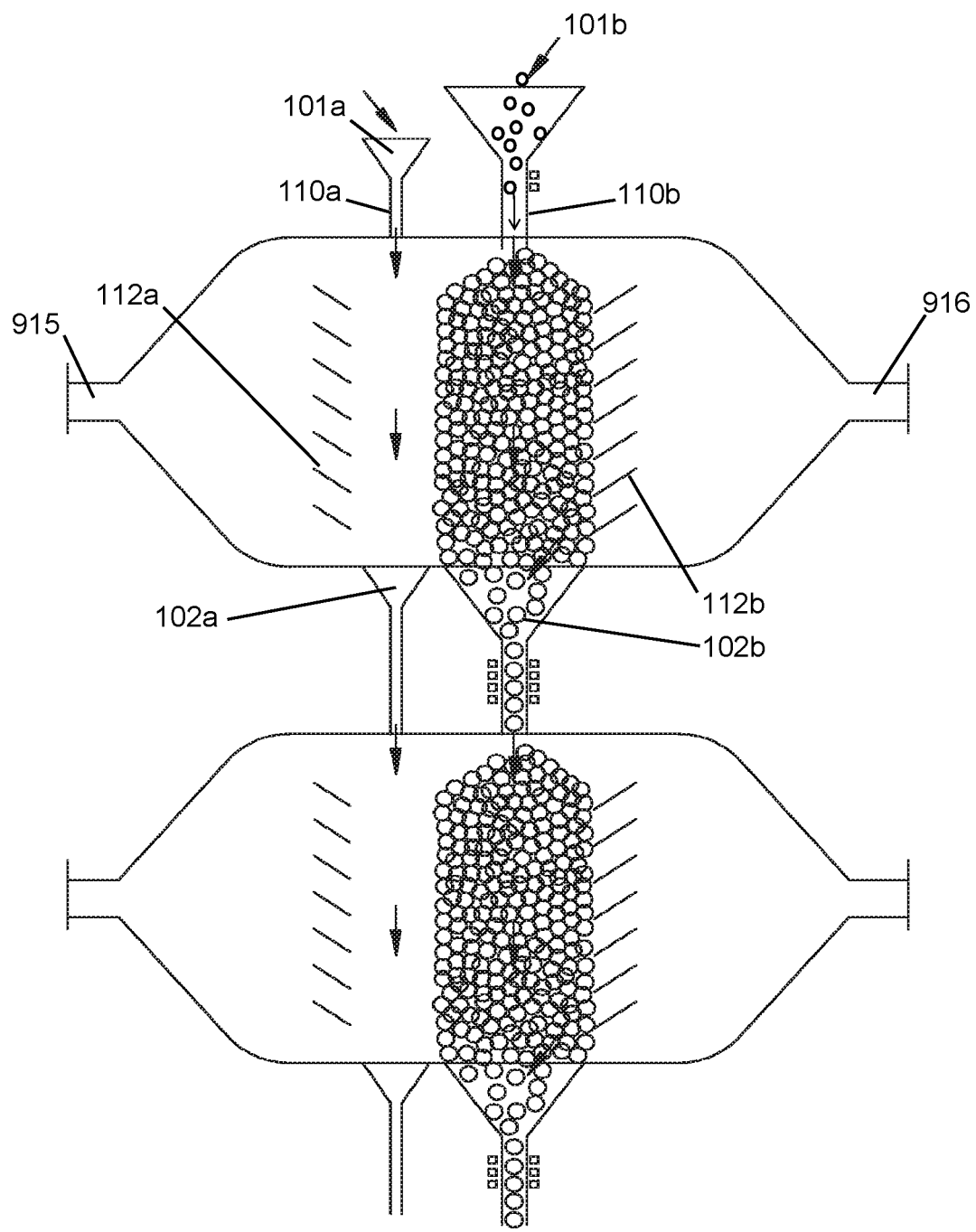
FIG. 9 is a schematic view of a reactor system for silane decomposition to form granular polysilicon.

FIG. 9 shows the two-zone reactor system for silane decomposition. Cold granules 101a travel downward on the left side of the chamber through 110a facing the incoming silane and hydrogen from port 915, warming up the incoming gas mixtures, but not causing serious deposition on 112a. However, once it reaches the heated hot granule bed 110b on the right side, silane decompose completely before reaching to the right side distributor 112b leaving pure hydrogen exiting from the right side port 916. This way long-term operation is assured. The cold granules 101a and heated granules 101b will travel down to next stage through 102a and 102b respectively.

Figure 10:
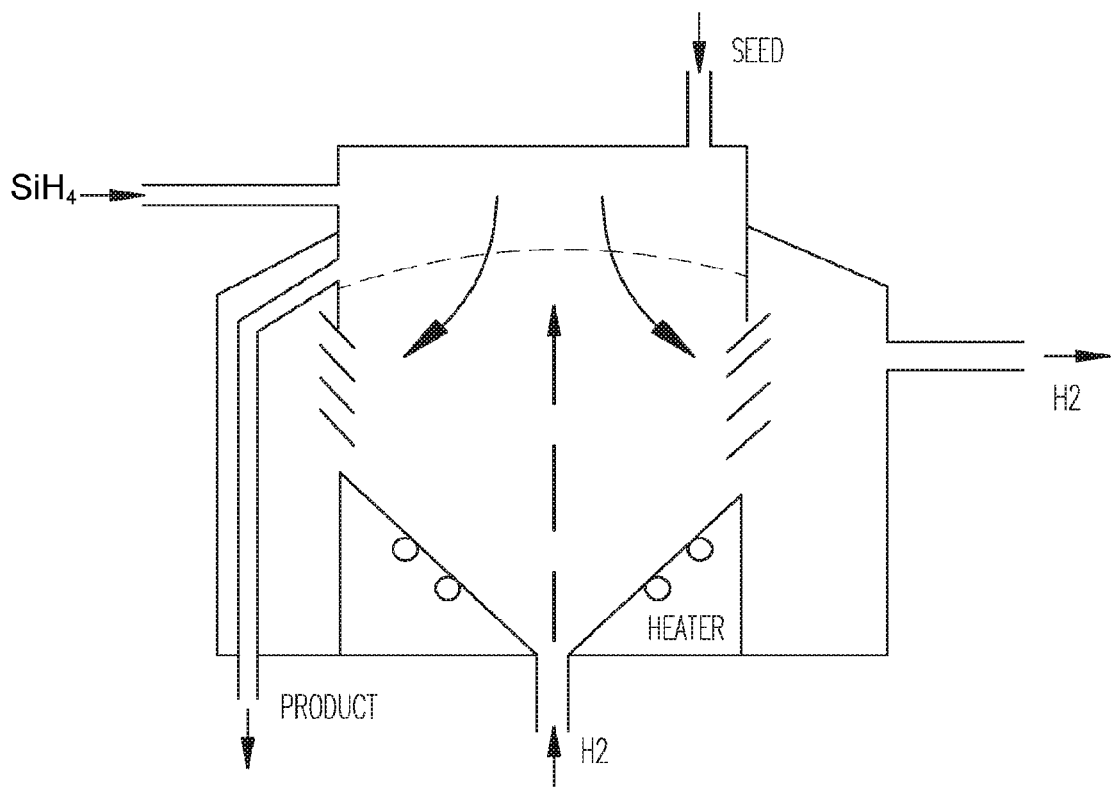
FIG. 10 shows a schematic view of shows a submerged bed reactor for silane decomposition into granular polysilicon.

FIG. 10 shows a submerged bed reactor for silane decomposition into granular polysilicon. High purity hydrogen (or $H_2$ and silane, silane is emitted from the center of the jet surrounded by hydrogen) is injected from the bottom of the reactor to stir/move the granular silicon in the bed, while silane from the top of the reactor is injected into the reactor. Since the top of the reactor chamber is sealed, all the gases including $H_2$ and silane are forced to penetrate the bed of granular polysilicon and to exit through the shutter-like gas distributor on the side of the reactor. On its way to the exit, all silane are completely decomposed into silicon on the surface of the granules, leaving hydrogen along with primary diluting hydrogen to exit through the distributor. During the operation, small seeds are added into the reactor from the seed port on the top of the reactor, and large product granules are withdrawn from the product collection port for further treatment if necessary. During the entire course of the reaction, the bed granules have to be heated and maintained at a reasonable temperature between 500 and 1200° C.

Similarly, a gas blender design can be used for the stirring and deposition of the bed. The gas can be singular or multiple jetspouts. However, it is preferred that the jets being in serious short pulses to just create the moving of the bed may create some embedded bubbles, but not penetrate the whole bed layer.

Granules Returning Systems

Conventional FBR (fluidized bed reactor) for granular polysilicon production using reacting gas to fluidize granules in the bed. It requires a large amount of gas during operation especially when produce large sized granules; it requires a min. gas flow to operate for a certain reactor design. Our system embodiments use alternative ways to move granules and this has a wider operation window and is more flexible in operation. It is even independent to gas flow that is available!

Figure 11:
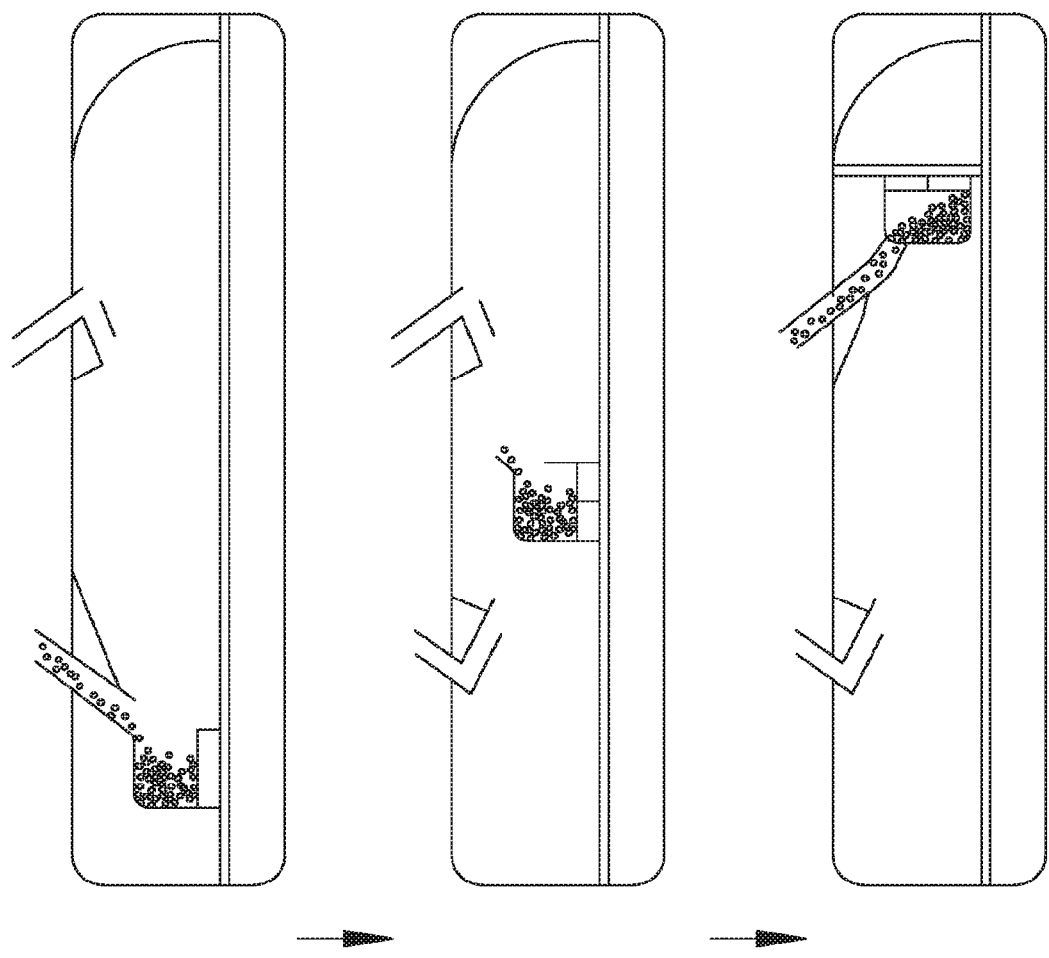
FIG. 11 shows a system for mechanical transport of silicon granules

FIG. 11 shows an economic way of transport granules. At the lower portion of the reactor, granules flow into a silicon-lined insulated bucket (bottom dump or pourable) through a foldable silicon-lined conduit. Once the bucket is full (with load cell). The conduit is lifted by a gas-spring, granule flow is stopped, the bucket is lifted to the top of the reactor by a motor driven elevating system. A second conduit is extended. Silicon granules are poured into the top section of the reactor via the second conduit. Once the bucket is empty, the top conduit is released, and the bucket return to the bottom for refilling. The whole system should be operated in a hydrogen or inert gas such as Ar, He atmosphere to prevent granular silicon from oxidation. Many other ways can be designed around this approach, Valves can be used to regulate to granule flow during loading and unloading of granules.

In addition to mechanical transport indicated above, a preferred method is to use a gas conveying system such as a line vacuum by Exair (made from pure silicon and quartz by Sunnyside Technologies, Inc) to transport granules continuously using hydrogen. Alternatively, a vacuum system can be used to transport granules to the top of the reactor periodically. The piping of the vacuum should have a silicon liner. Furthermore, pneumatic conveying systems using positive or negative pressure can be similarly used, provided the silicon contacting surface must be contamination free. To achieve this, in addition to the silicon liner, silane gas can be added to the pneumatic system to deposit silicon on all internal surfaces to compensate wear and to provide a contamination-barrier in all the systems mentioned above.

Gas Inlet Ports

As all gas inlet ports are in direct connection with high temperature reactor, deposition inside the ports should be avoided. To achieve this, a conduit is designed which allows hydrogen flow along the wall (parallel to the pipe or circling forward along the internal wall), while silane or TCS mixture flows through the central portion of the pipe. This prevents the direct contact of silicon containing gas with the internal wall of the pipe, thus eliminate the internal deposition. It is similar to the hydrogen curtain described in section 1.1 and also similar to a line vacuum described in 3.0, but with parallel or circulating flow of hydrogen.

Various Ways of Reactor Components Manufacturing

Figure 12:
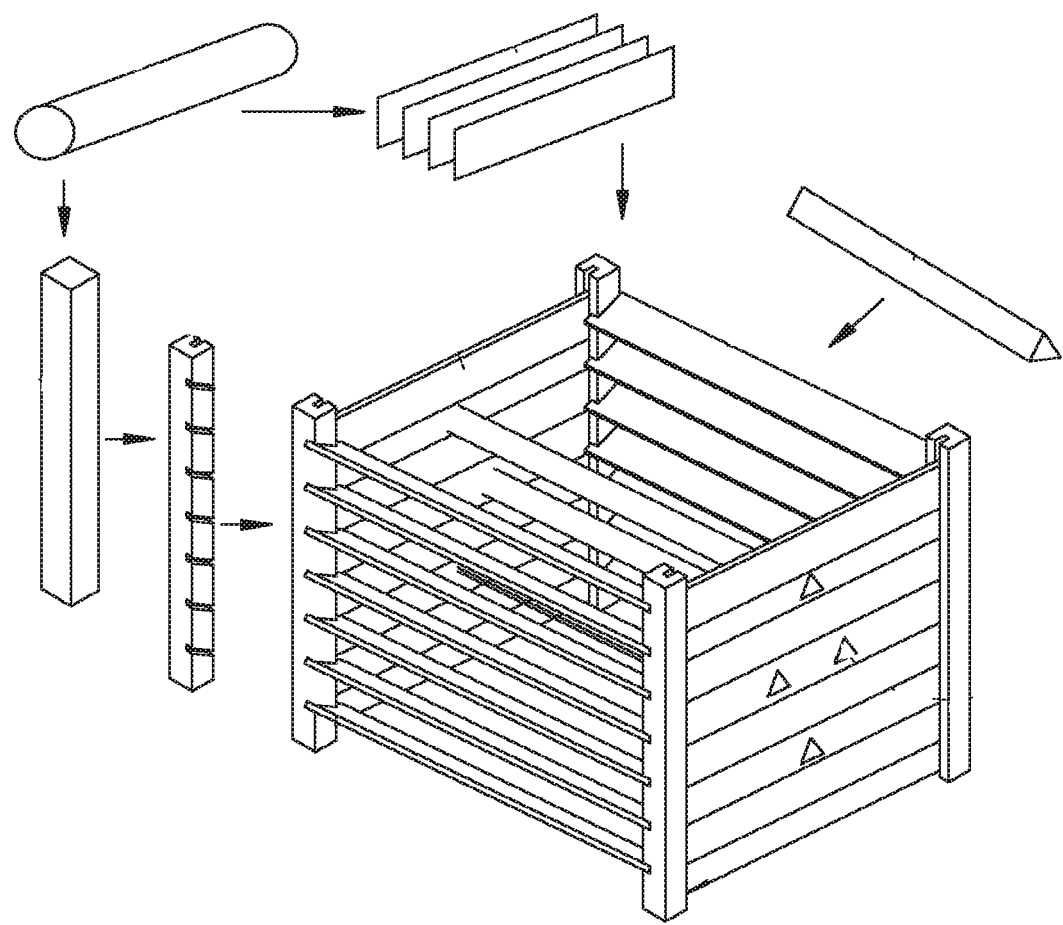
FIG. 12 is a schematic view of manufacturing a square double-shutter reactor chamber from single crystal ingot or polysilicon bar for granular polysilicon.

High purity graphite and quartz have been used for the liner of fluidized bed reactors for granular polysilicon production. This will introduce impurities into the product. Using high purity silicon as reactor liner was suggested previously, but no specific procedure of implementation has been described. In the current invention, Four procedures of using high purity silicon as liner and system components facing silicon products are employed. FIG. 12 is a schematic view of manufacturing a square double-shutter reactor chamber from single crystal ingot or polysilicon bar for granular polysilicon. This type of reactor chamber is used in systems shown in FIG. 3, FIG. 7, FIG. 9, and FIG. 10 respectively for mainly cross flow reactor operation.

Figure 13:
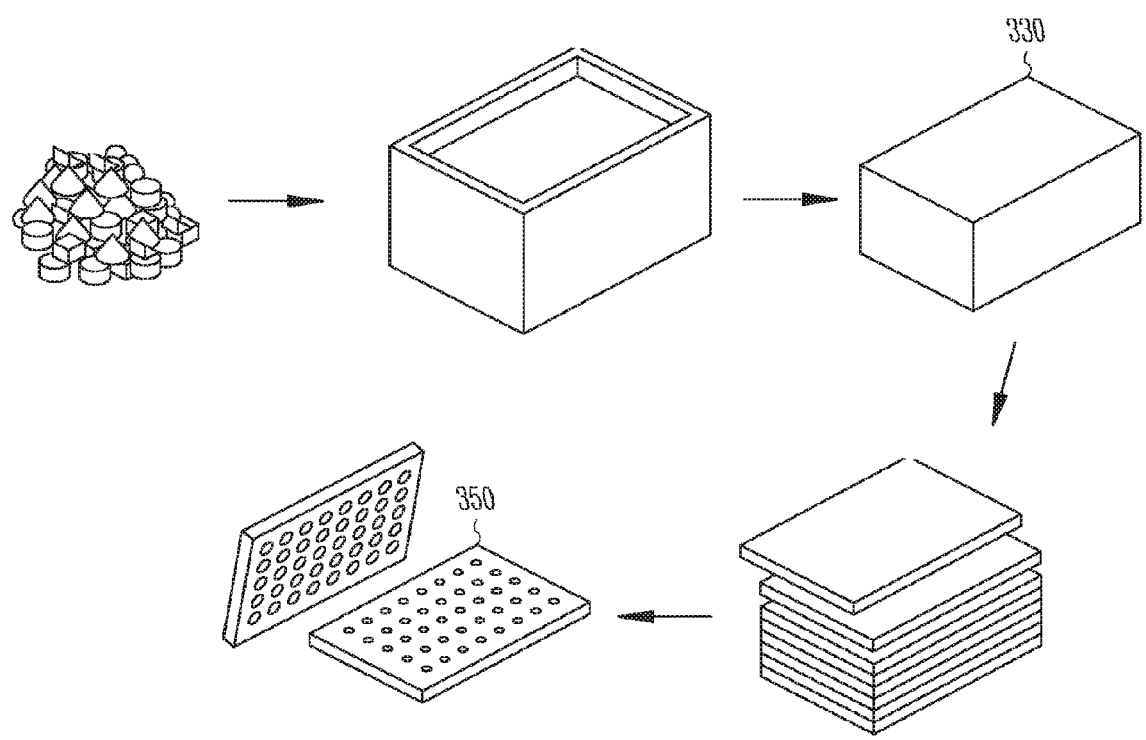
FIG. 13 shows a schematic view of manufacturing a high purity polysilicon screen from single crystal slabs or polysilicon bar for sieving granular polysilicon.

FIG. 13 shows a schematic view of manufacturing a high purity polysilicon screen 350 from single crystal slabs 330 or polysilicon bar for sieving granular polysilicon.

Figure 14:
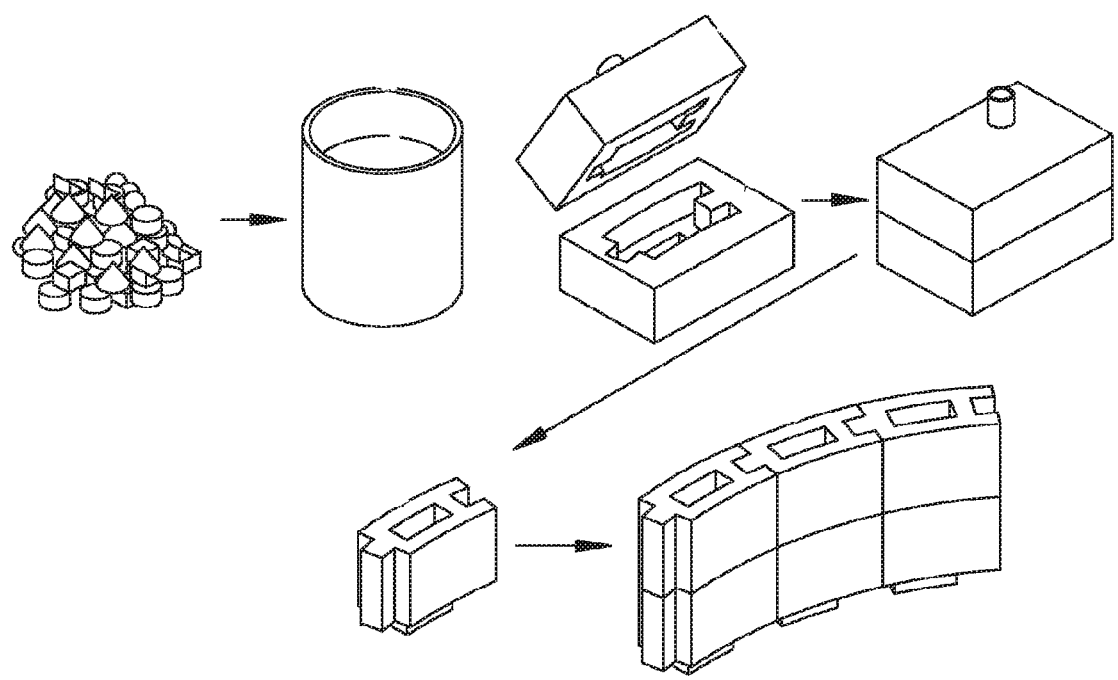
FIG. 14 shows a schematic view of casting a high purity polysilicon blocks for the construction of large diameter reactor liner.

FIG. 14 shows a schematic view of casting a high purity polysilicon blocks for the construction of large diameter reactor liner.

Figure 15:
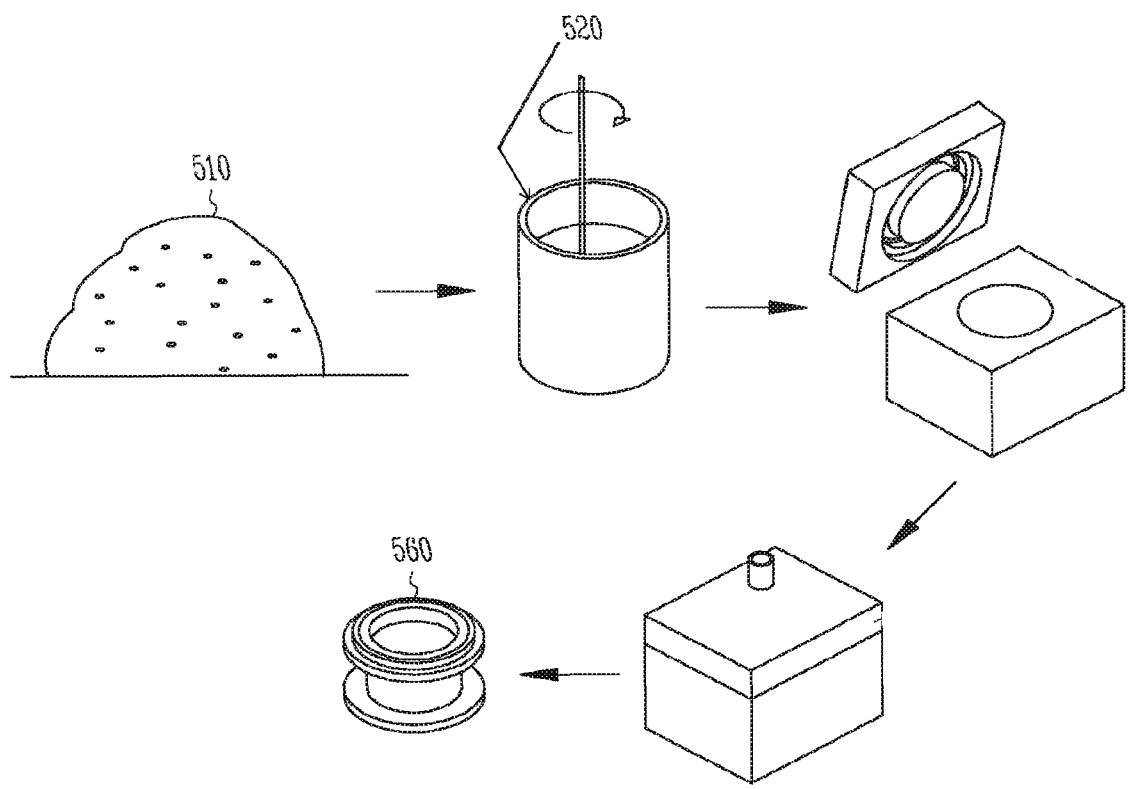
FIG. 15 shows a schematic view of making complex components in silicon transport system component by casting using high purity silicon powder and sintering afterwards.

FIG. 15 shows a schematic view of making complex components in silicon transport system component 560 by casting using high purity silicon powder 510 to form a green body 520. The green body 520 is then dried and sintered in vacuum or inert/reducing gases to form dense final components.

Finally, the embodiments described in the present invention merely illustrate general technical schemes. The invention is not limited to any specific embodiments. Despite the detailed description referred to in the aforementioned embodiment of the present invention, one skilled in the art should understand that modifications can be made in the technical diagram and certain technical embodiments can be modified or replaced. However, they are not necessarily deviated from the nature of spirit and scope of the invention.

What is claimed is:

1. A reactor for the production of high purity granular silicon, comprising:
   at least a reaction chamber equipped with at least a solid feeding port positioned at top of the reaction chamber; a solid output port positioned at bottom of the reaction chamber, an auxiliary gas inlet; a raw material gas inlet; and an outlet for exhaust gas; the reaction chamber being configured to receive silicon granules and to allow the silicon granules to form a silicon bed layer; the reaction chamber being internally equipped with at least a gas distributor for the dispersion of auxiliary gas and raw material gas to deposit silicon on the surface of silicon granules inside the reaction chamber;
   wherein a dynamics generating unit is further included inside the reactor, said dynamics generating unit being configured to cause said silicon granules to move inside said reaction chamber, and the reaction chamber is configured to provide a cross-flow mode,
   wherein the overall silicon granule moving direction and the raw material gas flow direction in the reaction chamber are generally perpendicular to each other.

2. The reactor of 1, wherein said dynamics generating unit is configured to provide ultrasonic vibration to the silicon granules.

3. The reactor of 2, wherein said dynamics generation unit is configured to provide mechanical vibration to said silicon granules.

4. The reactor of 3, wherein the reaction chamber is constructed of high purity silicon.

5. The reactor of 4, wherein the reaction chamber is constructed of high purity silicon nitride.

* * * * *